US011683682B2

(12) United States Patent
Faccin

(10) Patent No.: US 11,683,682 B2
(45) Date of Patent: Jun. 20, 2023

(54) NETWORK SLICE AUTHENTICATION FOR DEFAULT SLICES

(71) Applicant: QUALCOMM Incorporated, San Diego, CA (US)

(72) Inventor: Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/234,010

(22) Filed: Apr. 19, 2021

(65) Prior Publication Data

US 2021/0337383 A1 Oct. 28, 2021

Related U.S. Application Data

(60) Provisional application No. 63/029,167, filed on May 22, 2020, provisional application No. 63/014,050, filed on Apr. 22, 2020.

(51) Int. Cl.
*H04W 12/06* (2021.01)
*H04W 76/10* (2018.01)

(52) U.S. Cl.
CPC .......... *H04W 12/06* (2013.01); *H04W 76/10* (2018.02)

(58) Field of Classification Search
CPC ..... H04W 12/06; H04W 76/10; H04W 12/72; H04W 12/086
USPC .......................................................... 370/328
See application file for complete search history.

(56) References Cited

U.S. PATENT DOCUMENTS

| | | | | |
|---|---|---|---|---|
| 2015/0355966 | A1* | 12/2015 | Resch | G06F 3/067 714/766 |
| 2018/0132096 | A1* | 5/2018 | Huo | H04W 8/08 |
| 2018/0332523 | A1* | 11/2018 | Faccin | H04W 36/0033 |
| 2019/0174536 | A1* | 6/2019 | Han | H04W 74/0833 |
| 2019/0261185 | A1* | 8/2019 | Velev | H04W 48/18 |

(Continued)

FOREIGN PATENT DOCUMENTS

| | | | | |
|---|---|---|---|---|
| GB | 2593436 | A * | 9/2021 | H04W 12/06 |
| WO | WO-2018231028 | A1 * | 12/2018 | H04W 12/06 |
| WO | WO-2020186145 | A1 * | 9/2020 | H04L 67/34 |

OTHER PUBLICATIONS

Mahmoud Watfa (GB 2593436 A—print copy with page numbers), Slice-specific authentication and authorization, Sep. 29, 2021, 2021, pp. 1-25.*

(Continued)

*Primary Examiner* — Mahendra R Patel
(74) *Attorney, Agent, or Firm* — Qualcomm Incorporated

(57) ABSTRACT

A method for wireless communication performed by a user equipment (UE) includes determining whether a network slice-specific authentication and authorization (NSSAA) procedure is complete. The method also includes transmitting a protocol data unit (PDU) session request to attempt establishing a PDU session without providing an Single-NSSAI when the NSSAA procedure is complete. A method for wireless communications, by an access and mobility management function (AMF) includes determining whether all default network slices for a user equipment (UE) are subject to network slice-specific authentication and authorization (NSSAA). The method also initiates NSSAA on the default network slices when all default network slices are subject to NSSAA.

18 Claims, 7 Drawing Sheets

(56) References Cited

U.S. PATENT DOCUMENTS

2020/0389843 A1* 12/2020 Huang .................... H04W 8/08

OTHER PUBLICATIONS

3GPP TS 23.501, 3rd Generation Partnership Project; Technical Specification Group Services and System Aspects; System architecture for the 5G System (5GS); Stage 2 (Release 16), 3GPP TS 23.501 V16.9.0, Section 5.15.5.2.1, Jun. 2021, 6 Pages.

3GPP TS 23.502, 3rd Generation Partnership Project; Technical Specification Group Services and System Aspects; Procedures for the 5G System (5GS); Stage 2 (Release 17), 3GPP TS 23.502 V17.1.0, Section 4.3.2.2.1, Jun. 2021, 15 Pages.

* cited by examiner

NETWORK SLICE AUTHENTICATION FOR DEFAULT SLICES

CROSS-REFERENCE TO RELATED APPLICATIONS

The present application claims the benefit of U.S. Provisional Patent Application No. 63/014,050, filed on Apr. 22, 2020, titled "NETWORK SLICE AUTHENTICATION FOR DEFAULT SLICES," and U.S. Provisional Patent Application No. 63/029,167, filed on May 22, 2020, titled "NETWORK SLICE AUTHENTICATION FOR DEFAULT SLICES," the disclosures of which are expressly incorporated by reference in their entireties.

FIELD OF THE DISCLOSURE

Aspects of the present disclosure generally relate to wireless communications, and more particularly to techniques and apparatuses for authentication of default network slices.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communications, by a user equipment (UE), includes determining whether a network slice-specific authentication and authorization (NSSAA) procedure is complete. The method further includes transmitting a protocol data unit (PDU) session request to attempt establishing a PDU session without providing single-network slice selection assistance information (S-NSSAI) when the NSSAA procedure is complete.

In other aspects of the present disclosure, a method for wireless communications, by an access and mobility management function (AMF), includes determining whether all default network slices for a user equipment (UE) are subject to network slice-specific authentication and authorization (NSSAA). The method further includes initiating NSSAA on the default network slices when all default network slices are subject to NSSAA.

Other aspects of the present disclosure are directed to an apparatus for wireless communications at a user equipment (UE) having one or more processors, a memory coupled to the processors, and instructions stored in the memory. When the instructions are executed by the processors, the apparatus will determine whether a network slice-specific authentication and authorization (NSSAA) procedure is complete, and transmit a protocol data unit (PDU) session request to attempt establishing a PDU session without providing a single-network slice selection assistance information (S-NSSAI) when the NSSAA procedure is complete.

Other aspects of the present disclosure are directed to an apparatus for wireless communications at an access and mobility management function (AMF) having one or more processors, a memory coupled to the processors, and instructions stored in the memory. When the instructions are executed by the processors, the apparatus will determine whether all default network slices for a user equipment (UE) are subject to network slice-specific authentication and authorization (NSSAA), and initiate NSSAA on all default network slice when all default network slices are subject to NSSAA.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1A:
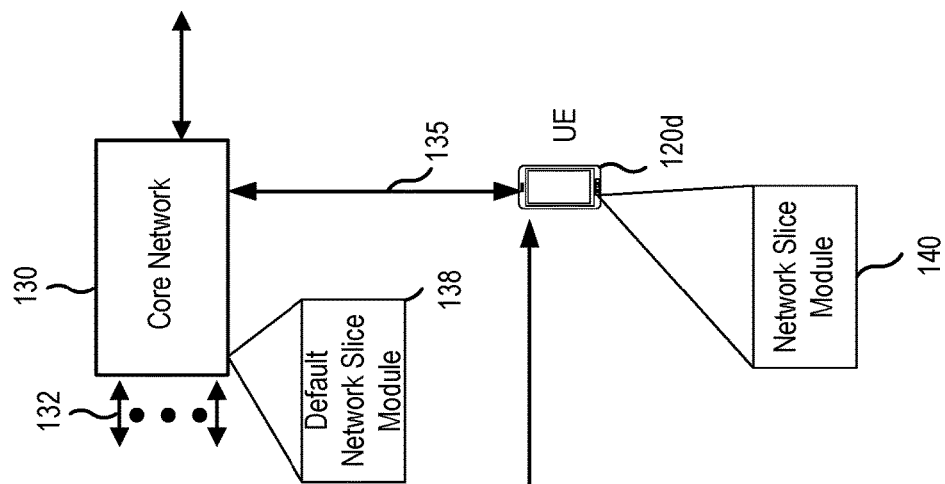
FIG. 1A is a block diagram conceptually illustrating an example of a wireless communications network, in accordance with various aspects of the present disclosure.
Figure 1A:
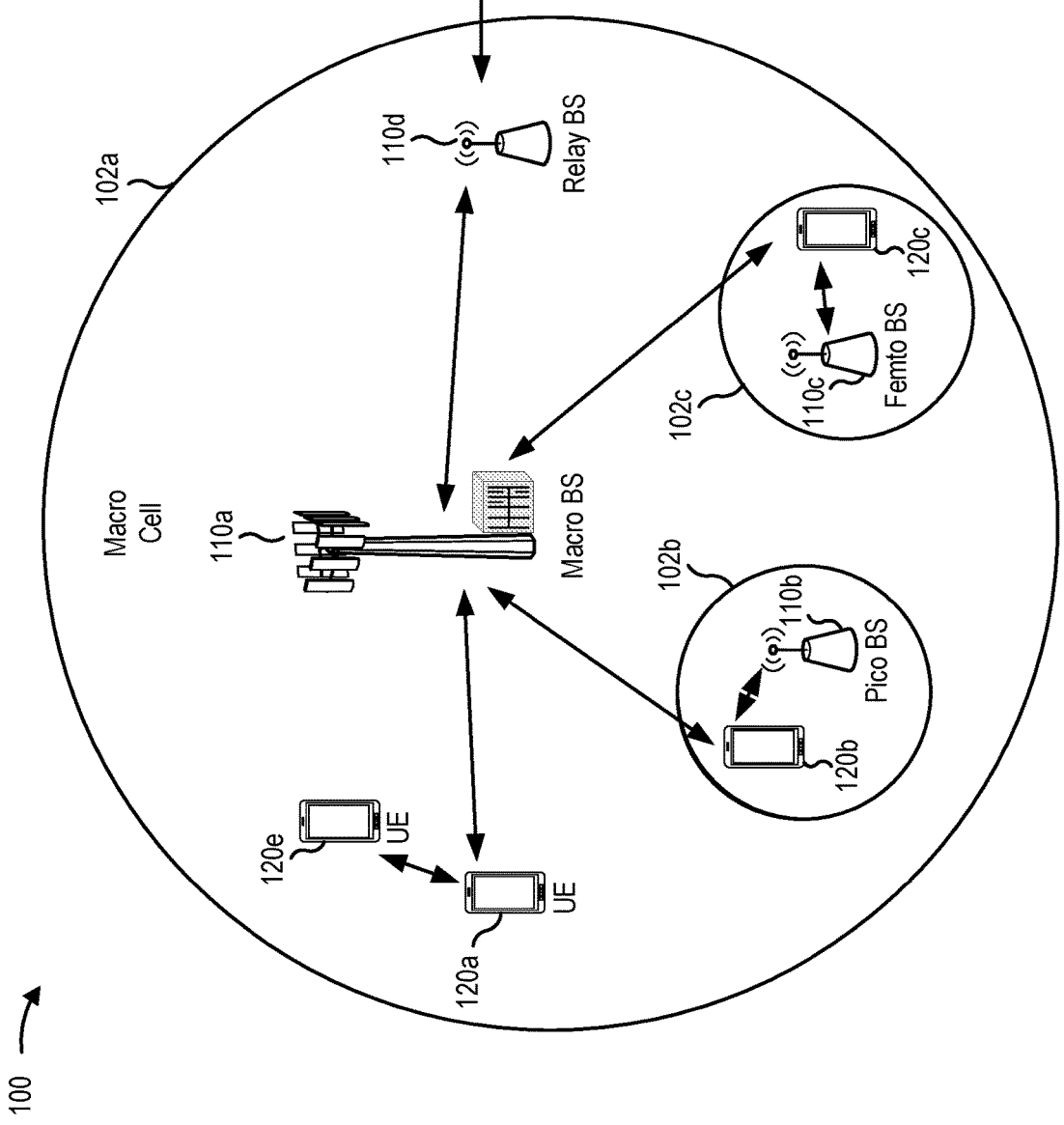

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Network slicing divides a single network connection into multiple distinct logical or virtual connections. Each logical connection may provide a different amount of resources to different traffic types. Network slices of a UE may be served by an access and mobility management function (AMF). In addition, session management of the network slices may be performed by a session management function (SMF). The network may, in some cases, provide network slice selection assistance information (NSSAI) or single-network slice selection assistance information (S-NSSAI) to the UE. The NSSAI may include information indicating allowed or supported network slices for the UE to use, among other information. The AMF and SMF may be components of a core network.

A UE may establish a protocol data unit (PDU) session with the network for a network slice (e.g., a logical data network). In some cases, a UE may select a network slice based on an application or subscription service. In some examples, network slice-specific authentication and authorization (NSSAA) may be specified for a default network slice, or a requested network slice, prior to granting access to a UE. In some examples, an Internet protocol (IP) multimedia systems (IMS) voice application may be installed in the UE. In such examples, the UE may select a network slice configured to support the IP IMS voice application. In other examples, an Internet-of-Things (IoT) application may be installed in the UE. The IoT application may configure the UE to operate as an IoT gateway device that compiles and transmits data to a remote server. In such examples, the UE may select a network slice configured to support IoT data traffic. The UE may improve network resource utilization by having different network slices serving different applications or subscriptions. Additionally, by using different network slices, the UE may also satisfy performance specifications of the UE's individual applications.

As described, the UE may establish a PDU session with the network for a network slice. A PDU session request may include an indication of the network slice, such that the PDU session is associated with the indicated network slice. In some cases, the PDU session request may not include an indication of one or more network slices. In such cases, the AMF may select a default network slice based on the UE subscription information and local policies, using one of the available default network slices in the UE subscription.

In some examples, the UE registers with a network without establishing a PDU session. In some instances, when registering with the network, the UE may provide the network with a list of requested network slices. In response to the registration request, the AMF may identify network slices that may be accessed by the UE based on local policies and UE subscription information. The AMF transmits a message to the UE indicating the allowed network slices. In some examples, the allowed network slices may include one or more default network slices defined in the UE subscription profile. In some such examples, the allowed network slices include one or more default network slices when the UE is not allowed access to the network slices requested by the UE.

As described above, the UE may register with a network without establishing a PDU session. In such examples, the AMF may not authenticate the default network slices when one or more of the requested network slices are allowed. After registering with the network and receiving an indication of an allowed network slice, the UE may transmit a PDU session request to the network to establish a PDU session for a network slice. In some examples, the PDU session request does not include an indication of one or more network slices. In such examples, the network may associate a default network slice with the requested PDU session. In some such examples, NSSAA may be specified for the default network slice. In these examples, the network may fail to initiate an authorization procedure for the default network slice, resulting in a loss of connectivity for the UE. It is desirable to improve a default network slice authorization process to improve UE connectivity.

FIG. 1A is a block diagram conceptually illustrating an example of a wireless communications network 100 in in accordance with various aspects of the present disclosure. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1A, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1A, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 via a radio access network (RAN) (not shown in FIG. 1A) through a communications link 135. For ease of explanation, only one communication link 135 is shown in FIG. 1A. Each UE 120 (e.g., 120a, 120b, 120c) may communicate with the core network 130 via the RAN through a different communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a PDU session for a network slice. In some cases, the UE 120 may select a network slice based on an application or subscription service. By having different network slices serving different applications or subscriptions, the UE 120 may improve its resource utilization in the wireless communications network 100, while also satisfying performance specifications of individual applications of the UE 120. In some cases, the network slices used by the UE 120 may be served by an AMF (not shown in FIG. 1A) associated with one or both of the base station 110 or core network 130. In addition, session management of the network slices may be performed by an SMF.

The AMF may include a default network slice module 138 for determining whether all default network slices are subject to NSSAA, and initiating NSSAA on all default network slices when all default network slices s are subject to NSSAA. In FIG. 1A, the default network slice module 138 is shown as a component of an AMF (not shown) of the core network 130.

The UEs 120 may include a network slice module 140. For brevity, only one UE 120d is shown as including the network slice module 140. The network slice module 140 may determine whether an NSSAA procedure is complete, and transmit a PDU session request to attempt establishing a PDU session without providing an S-NSSAI when the NSSAA procedure is complete. In some implementations, the network slice module 140 may also inhibit transmission of the PDU session request until the NSSAA procedure is complete.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

As indicated above, FIG. 1A is provided merely as an example. Other examples may differ from what is described with regard to FIG. 1A.

Figure 1B:
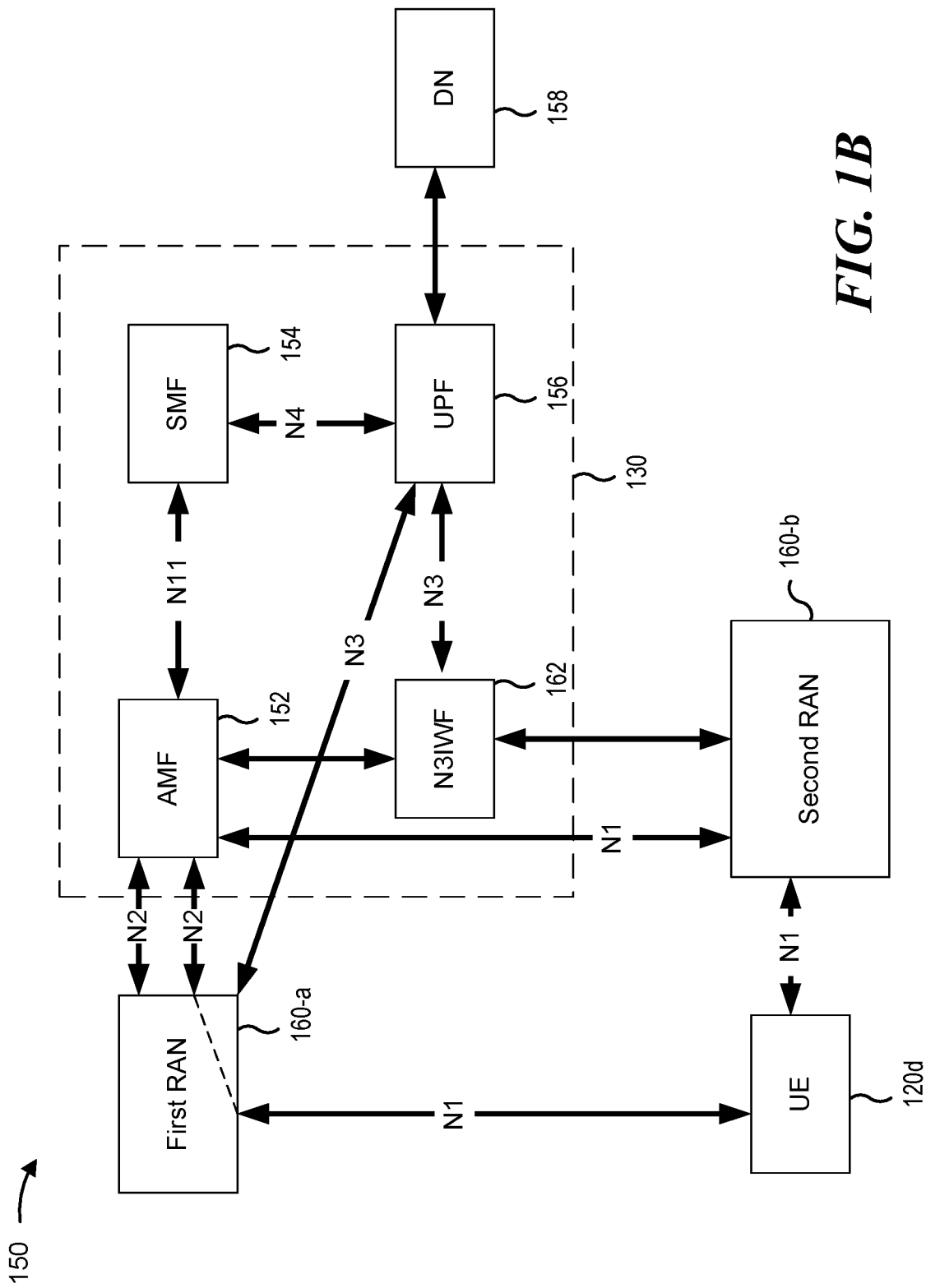
FIG. 1B is a block diagram illustrating an example of a wireless communications network, in accordance with various aspects of the present disclosure.

FIG. 1B is a block diagram illustrating an example of a wireless communications network 150 in accordance with various aspects of the present disclosure. The wireless communications network 150 may include the UE 120d and the core network 130, which may be examples of the UE 120d and the core network 130 as described with respect to FIG. 1A. The core network 130 may include an access and mobility management function (AMF) 152, an SMF 154, a user plane function (UPF) 156, and a non-3GPP interworking function (N3IWF) 162, among other components. The wireless communications network 150 may also include a first radio access network (RAN) 160-a, second RAN 160-b and a data network (DN) 158.

In some aspects, the UE 120d may communicate with the core network 130 via the first RAN 160-a using a first radio access technology (RAT) and/or second RAN 160-b using a second RAT. The first RAN 160-a may be a 3GPP RAN in which communications are transmitted over 3GPP access node, while the second RAN 160-b may be a non-3GPP RAN in which communications are transmitted over non-3GPP access. In other examples, both the first RAN 160-a and second RAN 160-b may be 3GPP RANs in which communications are transmitted over 3GPP access.

As discussed above, the core network 130 may provide the UE 120d access to a wireless communications network and transport data from the data network 158 to the UE 120d. For instance, the core network 130 may restrict or authorize the UE 120d to access the network and may support mobility services for the UE 120d as the UE 120d moves about the network coverage area.

The AMF 152 may provide access and mobility management services for the UE 120d. In some examples, the AMF 152 may serve as the primary point of control plane signaling communications with the UE 120d, such that all control plane communications between the UE 120d and the core network 130 may pass through the AMF 152 (either directly for communications over 3GPP access, or both directly and indirectly via the N3IWF 162 for non-3GPP access). In some examples, an N1 signaling interface is used solely for control plane signaling (e.g., is used to signal information for control plane services but not to transport user plane data). For example, for uplink communications, the UE 120d may identify a payload for a control plane service to transmit to a specific network entity (or function) of the core network 130, and may transmit the payload to the AMF 152. Similarly, for downlink communications, a network entity (or function) may transmit a payload for a control plane service to the AMF 152, and the AMF 152 may relay the payload to the UE 120d with control plane signaling over N1. The AMF 152 may communicate with the SMF 154 over communications link N11, and may communicate with the UE 120d over communications link N1. Communications between the AMF 152 and the UE 120d may be over 3GPP access or non-3GPP access. In some examples, the AMF 152 may page the UE 120d. For instance, the AMF 152 may page the UE 120d if the UE 120d is in a connection management (CM) idle (CM IDLE) state. The AMF 152 may transmit the paging message to the UE 120*d* over the 3GPP access or the non-3GPP access.

The SMF 154 may provide session management services for the UE 120*d*. In some examples, the SMF 154 may establish, modify, and release sessions (or bearers) for communications between the UE 120*d* and the data network 158. For example, the SMF 154 may maintain a tunnel for communications between the UPF 156 and an access network (AN) node. In addition, the SMF 154 may allocate and manage IP addresses or Ethernet addresses for the UE 120*d*, select and control user plane functions, configure traffic steering at the UPF 156 to route traffic to proper destinations, terminate session management (SM) parts of non-access stratum (NAS) messages, and provide roaming functionality. The SMF 154 may communicate with the UPF 156 over communications link N4 and may communicate with the AMF 152 over communications link N11. For example, the SMF 154 may receive a notification from the UPF 156 over communications link N4 when there is no user plane tunnel N3 established for an existing session. The notification may indicate that there is data (e.g., one or more PDUs) ready for transmission to the UE 120*d* for a PDU session. In some aspects, a PDU session is established before the UE 120*d* exchanges user data with the core network 130.

The UPF 156 may include functionality for serving as the point of interconnect to the DN 158 for an external PDU session. In some aspects, the UPF 156 may be the anchor point for intra-RAT and inter-RAT mobility. The UPF 156 may route and forward packets to and from the DN 158, inspect packets and enforce policy rules in the user plane, report traffic usage, handle quality of service (QoS) for user plane packets, and verify uplink traffic.

The N3IWF 162 may include functionality for serving as an intermediary between the UE 120*d* and the AMF 152 for communications over the non-3GPP access, such as communications for registration and session establishment. For example, during registration, the N3IWF 162 may select an appropriate AMF and relay authentication and registration messages received from the UE 120*d* to the AMF 152, and vice versa. The N3IWF 162 may also route uplink and downlink transmissions between the UE 120*d* and the DN 158 via the UPF 156 over communications link N3.

The data network (DN) 158 may transfer data between network access points. In some aspects, the DN 158 may be an example of a local DN, a central DN, or a public land mobile network (PLMN). In some wireless systems (e.g., a 5G wireless system), the UE 120*d* may access the DN 158 to exchange data packets, or one or more PDUs, using a PDU session. A PDU session may be an association between the UE 120*d* and the DN 158 that provides a PDU connectivity service. The association between the UE 120*d* and the DN 158 in a PDU session may use IP or Ethernet, or the association may be unstructured.

The UE 120*d* may perform a registration procedure to register with the core network 130 to receive authorization to access mobile services (e.g., an initial registration), enable mobility tracking, and/or enable reachability. The UE 120*d* may perform a registration procedure for initial access to the core network 130, when changing to a new tracking area (TA) while in an idle mode, and/or when performing a periodic update.

In some examples, the UE 120*d* may register over one or more accesses to the core network 130. For instance, the UE 120*d* may register to the core network 130 via the first RAN 160-*a*. The first RAN 160-*a* may be a 3GPP access network (e.g., LTE, 5G, etc.), and may be referred to as a 3GPP access. The UE 120*d* may also register to the same or a different core network 130 via the second RAN 160-*b*. The second RAN 160-*b* may be non-3GPP access or untrusted non-3GPP access (e.g., Wi-Fi), and may be referred to as non-3GPP access. When the UE 120*d* registers over the first RAN 160-*a* and the second RAN 160-*b* to the same core network (e.g., the core network 130), the AMF 152 may manage and keep track of both the 3GPP access and the non-3GPP access. When the UE 120*d* registers over the first RAN 160-*a* and the second RAN 160-*b* to different core networks (e.g., different PLMNs), multiple AMFs (not shown) may be used, where one AMF may manage and keep track of the 3GPP access and the other AMF may manage and keep track of the non-3GPP access. In some aspects, the UE 120*d* may access the core network 130 via the first RAN 160-*a* while concurrently accessing the core network 130 via the second RAN 160-*b*. In other aspects, the UE 120*d* may access the core network 130 solely via the first RAN 160-*a* or the second RAN 160-*b*. In some examples, the UE 120*d* registers with the core network 130 without establishing a PDU session.

Figure 2:
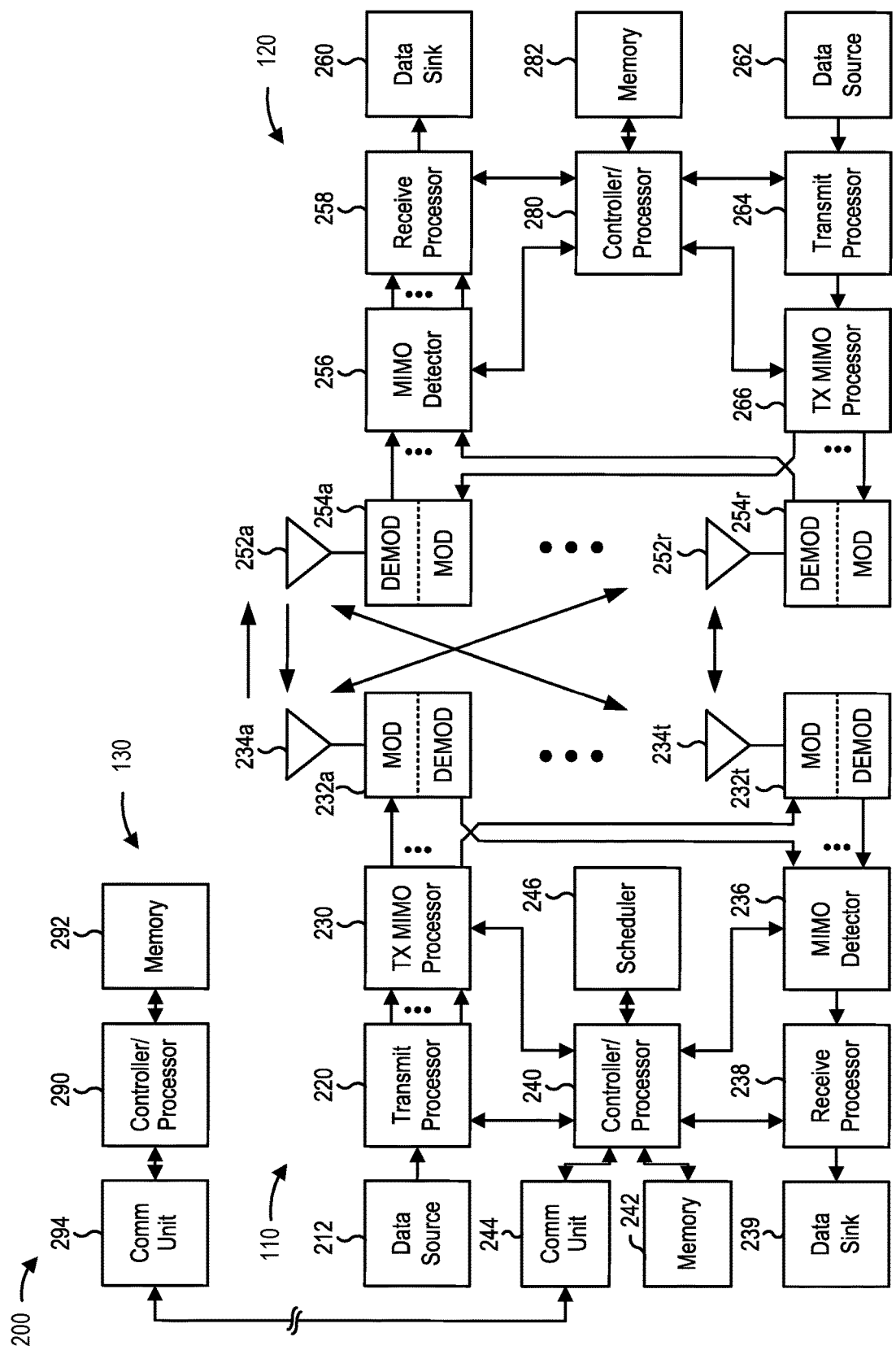
FIG. 2 is a block diagram conceptually illustrating an example of a base station in communication with a user equipment (UE) in a wireless communications network, in accordance with various aspects of the present disclosure.

FIG. 2 is a block diagram 200 conceptually illustrating an example of a base station in communication with a UE, which may be one of the base stations 110 and one of the UEs 120 in FIG. 1A, in a wireless communications network, in accordance with various aspects of the present disclosure. The base station 110 may be equipped with T antennas 234*a* through 234*t*, and UE 120 may be equipped with R antennas 252*a* through 252*r*, where in general $T \geq 1$ and $R \geq 1$.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 290 of the core network 130, the controller/processor 280 of the UE 120, and/or any other component(s) of FIG. 2 may perform one or more techniques associated with network slice authentication for default slices, as described in more detail elsewhere. For example, the controller/processor 290 of the core network 130, the controller/processor 280 of the UE 120, and/or any other component(s) of FIG. 2 may perform or direct operations of, for example, the processes of FIGS. 4-5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for determining whether a network slice-specific authentication and authorization (NSSAA) procedure is complete and means for transmitting a PDU session request to attempt establishing a PDU session without providing a single-network slice selection assistance information (S-NSSAI) when the NSSAA procedure is complete. Such means may include one or more components of the UE 120 or base station 110 described in connection with FIG. 2.

In some aspects, an AMF 152 may include means for determining whether all default S-NSSAIs are subject to NSSAA and means for initiating NSSAA on all default S-NSSAIs when all default S-NSSAIs are subject to NSSAA. The AMF may include one or more components similar to those of the base station 110 described in connection with FIG. 2. Such means may include one or more of such components.

As indicated above, FIG. 2 is provided merely as an example. Other examples may differ from what is described with regard to FIG. 2.

As described above, a UE may establish a PDU session for a logical data network, such as a network slice. In some aspects, the network slice related to the PDU session may be subject to NSSAA. In such aspects, the PDU session is established after the NSSAA procedure for the network slice is successful. The PDU session may not be established if the NSSAA procedure for the network slice fails. In some examples, an operator may generate network slices within a physical network to separate services. That is, the services of one virtual network may be separated from the services of another virtual network. For example, one network slice may correspond to multimedia services while another network slice may be dedicated to automotive services.

In some examples, each network slice may be associated with a different authentication and authorization policy based on the UE's subscription and a subscription to slice services provided by a third party service provider. For example, a UE may request to establish a subscription with an enhanced mobile broadband (eMBB) slice, an Internet-of-Things (IoT) slice, or a mission critical slice. An access and mobility management function (AMF), such as the AMF 152 as shown in FIG. 1B, of a core network, such as the core network 130 shown in FIGS. 1A-1B, may apply a different authorization policy for each subscription based on one or more subscription demands (e.g., security needs such as encryption and integrity protection algorithms, and security termination points).

In some instances, a UE exchanges uplink and downlink communications with a network using a particular network slice. The data may be communicated via an established PDU session for the particular network slice. In some implementations, the UE may include an indication of one or more network slices corresponding to the PDU session when transmitting a PDU session request.

The network slice indicated in the PDU session request may provide improved communications capabilities in comparison to default network slices. For example, the indicated network slice may be more reliable than the default network slice or the indicated network slice may have less latency than the default network slice. The network slice may be selected based on one or more terms of a service level agreement (e.g., corresponding to one or more quality of service (QoS) parameters) between a service provider of the network and an entity associated with the application, an entity associated with the UE, and/or an entity associated with the destination of the data traffic.

In some cases, NSSAA may be initiated for a requested network slice and/or a default network slice. In some such cases, when the UE registers with the AMF, one of the S-NSSAIs of the home public land mobile network (HPLMN) that maps to an S-NSSAI in the Requested NSSAI may specify NSSAA. The S-NSSAI may be added to the Allowed NSSAI by the AMF once the NSSAA procedure for the S-NSSAI succeeds.

For example, a UE may request access to an automotive network slice provided by a vehicle manufacturer. The requested automotive network slice may specify NSSAA before granting access to the UE. In some such examples, the AMF may communicate with an operator (e.g., network service provider) of the automotive network to authenticate the automotive network slice requested by the UE. In such an example, the operator may verify that a service fee has been paid and authorize the access when payment is verified. The AMF may provide access to the requested automotive network slice when the NSSAA succeeds.

In aspects of the present disclosure, unless otherwise indicated, the network slice is identified by single-network slice selection assistance information (S-NSSAI). As described above, when registering with the network, the UE provides the network with a list of requested S-NSSAIs in the Requested NSSAI. The network may identify one or more network slices (e.g., S-NSSAIs) that may be accessed by the UE based on local policies and UE subscription information. In some implementations, the network transmits a message to the UE indicating the Allowed NSSAI. One or more S-NSSAIs in the list of requested S-NSSAIs may be included in the Allowed NSSAI.

In some examples, the Allowed NSSAI may include one or more default S-NSSAIs defined in the UE subscription profile when none of the S-NSSAIs in the list of requested S-NSSAIs is allowed for the UE. In such examples, NSSAA for requested S-NSSAIs may fail or the requested S-NSSAIs may not be available. That is, the AMF may be unable to allow/provide access to any of the S-NSSAIs included in the Requested NSSAI. In such examples, the AMF may include one of the default S-NSSAIs in the Allowed NSSAI, such that the UE has some type of connectivity.

In some cases, the UE may not include an S-NSSAI indication in the PDU session request. In such cases, the AMF may select one or more default network slices (Default S-NSSAIs) indicated in the UE's subscription. That is, if a non-access stratum (NAS) message for a PDU session request does not include a network slice (e.g., S-NSSAI), the AMF determines a default network slice of an HPLMN for the requested PDU session. The default network slice may be selected according to a UE subscription, or based on operator policy.

The default network slice may be stored in a unified data manager (UDM), as a UE subscription, along with an indication of whether the default network slice is subject to NSSAA. As discussed, the AMF will not use the default S-NSSAIs if the Allowed NSSAI can be formed from the Requested NSSAI. During PDU session establishment, if the UE does not provide an S-NSSAI, the AMF attempts to use the default S-NSSAI for establishing the PDU session in response to the PDU session request.

Figure 3A:
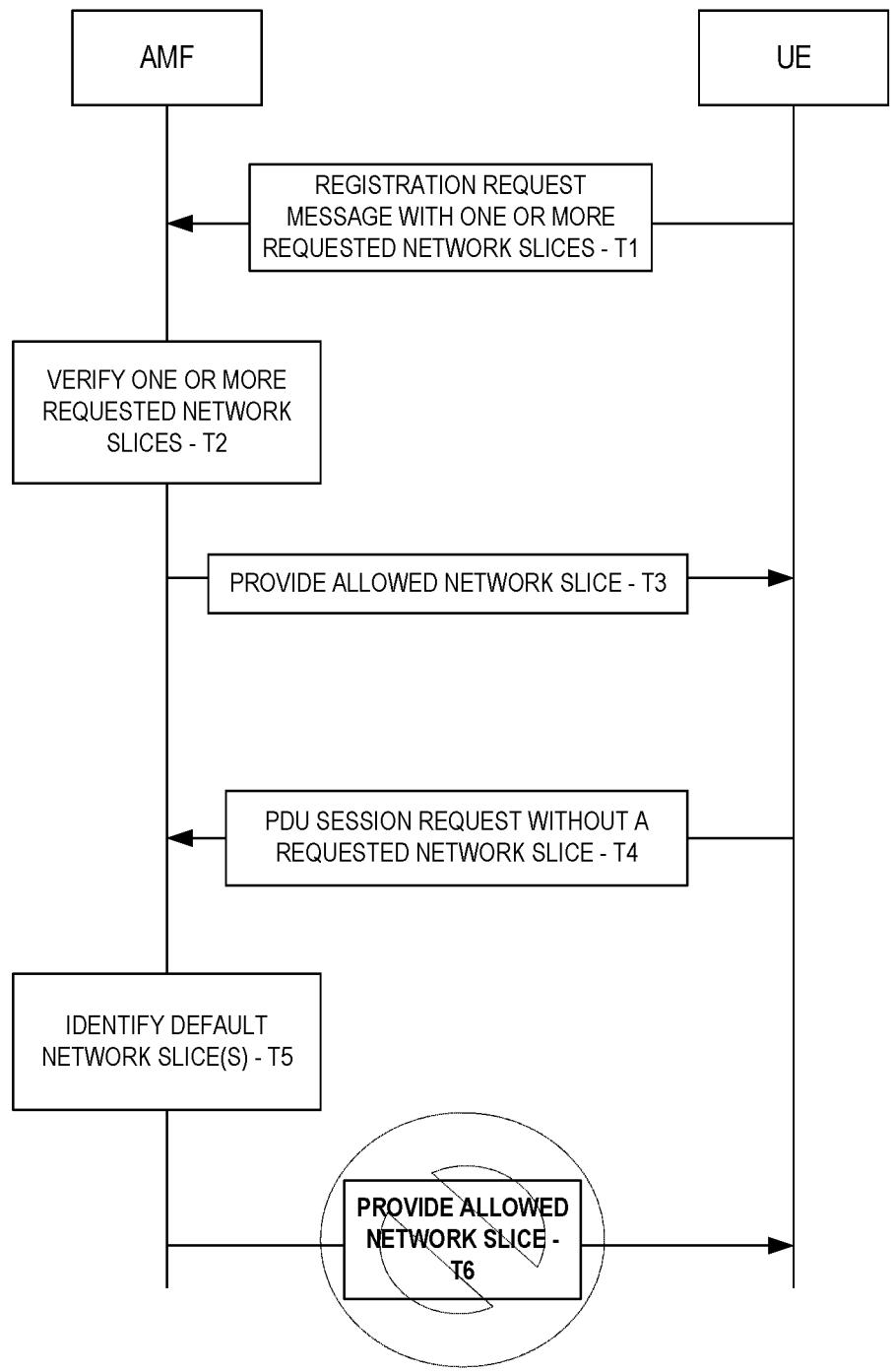
FIGS. 3A and 3B are timing diagrams illustrating examples of slice connectivity, in accordance with aspects of the present disclosure.

FIG. 3A is a timing diagram illustrating an example for network slice connectivity in a conventional wireless communications network, in accordance with aspects of the present disclosure. As shown in FIG. 3A, at time T1, a UE may transmit a registration request message to an AMF. The registration request message may include one or more S-NSSAIs in the Requested NSSAI. For example, the UE may request three network slices (e.g., S-NSSAIs). At time T2, the AMF may verify whether the S-NSSAIs included in the Requested NSSAI may be allowed for the UE based on UE subscription and slice availability. For example, the AMF may perform NSSAA on a second requested network slice of the three requested network slices. The second requested network slice is added to the Allowed NSSAI if the NSSAA succeeds. At time T3, the AMF transmits an indication of the Allowed NSSAI to the UE.

At a later time (e.g., time T4), the UE may transmit a PDU session request without providing a network slice request. In response to receiving the PDU session request without a requested network slice, the AMF selects a default network slice (time T5). The default network slice may differ from the network slice(s) requested by the UE at time T1. In this example, all default network slices specify NSSAA. In conventional systems, the AMF fails to provide connectivity because the AMF does not have a mechanism to perform the NSSAA during a PDU session establishment, and the default slice was not authenticated and authorized during registration. Thus, at time T6, the AMF rejects the PDU session establishment because the AMF cannot authenticate and authorize the default network slice. In such an example, the PDU session may not be established when the AMF cannot authenticate and authorize the default network slice.

In conventional systems, in some examples, the NSSAA procedure for a default network slice in response to a PDU session request may not be initiated if a current allowed network slice was established based on a network slice requested in a previous registration request. In such examples, the PDU session request does not include a network slice request. Additionally, the PDU session request is transmitted after the registration request. That is, the AMF never used a default network slice during registration, and therefore, never performed NSSAA for the default network slice. It is desirable to perform NSSAA for default network slices to mitigate the aforementioned lack of connectivity scenarios of conventional networks.

Figure 3B:
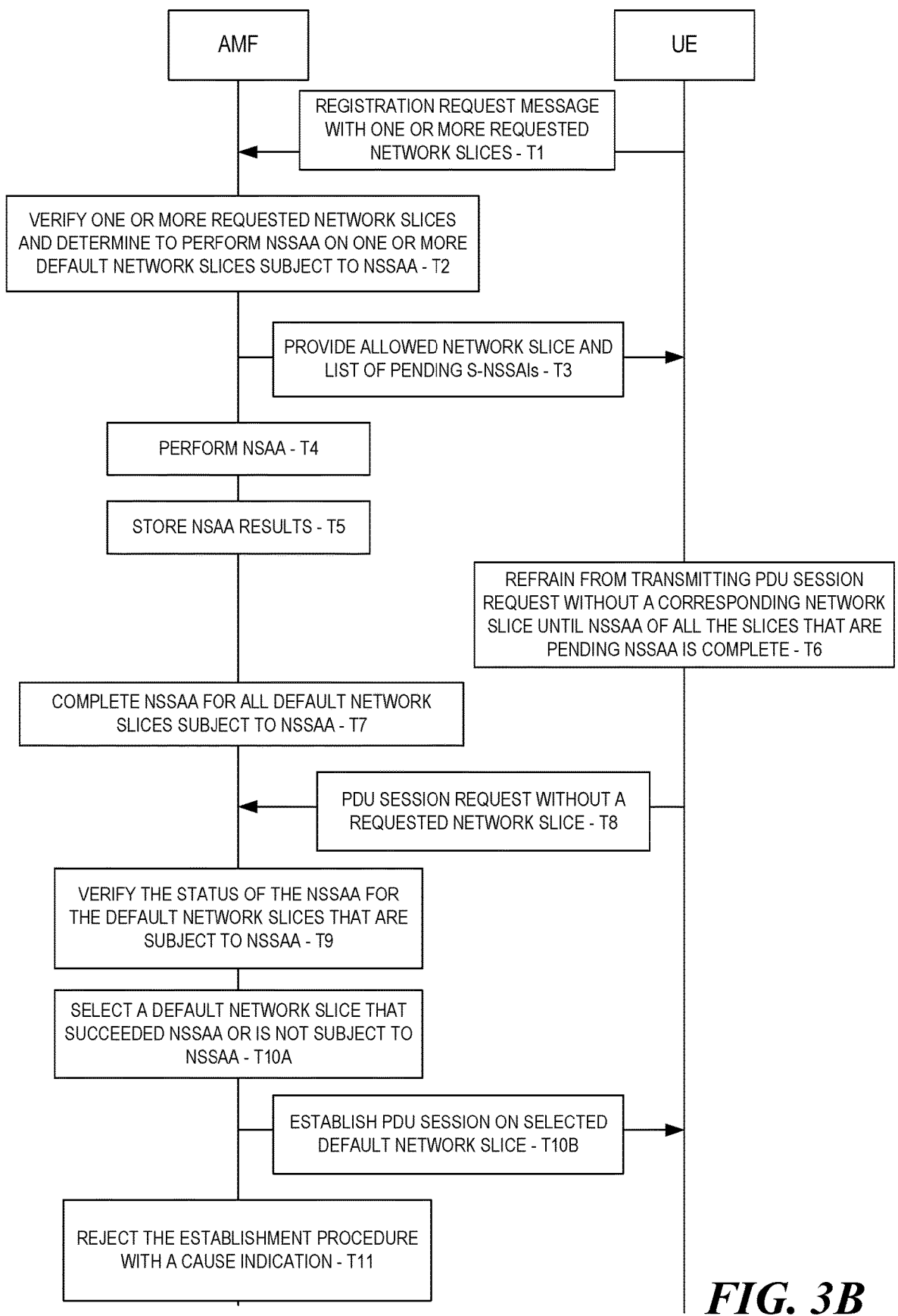

FIG. 3B is a timing diagram illustrating an example of network slice connectivity in a wireless communications network, in accordance with aspects of the present disclosure. As shown in FIG. 3B, at time T1, a UE, such as the UE 120d of FIGS. 1A-1B, may transmit a registration request message to an AMF, such as the AMF 152 of FIG. 1B. The registration request message may include one or more S-NSSAIs in the Requested NSSAI. At time T2, the AMF may verify one or more of the requested network slices. Additionally, at time T2, in response to the registration request, the AMF determines to authenticate and authorize (e.g., perform NSSAA) on one or more of the default network slices indicated in the UE subscription profile, if all default network slices are subject to NSSAA as indicated in the UE subscription profile. That is, the AMF determines that the NSSAA procedure should be initiated on the default S-NSSAIs if all default S-NSSAIs are subject to NSSAA.

In some configurations, the AMF updates a list of network slices that are pending NSSAA to include the default network slices that are pending NSSAA. That is, the list of Pending S-NSSAIs includes S-NSSAIs for which NSSAA is to be performed, and the list of Pending S-NSSAIs includes the default NSSAI(s) for which NSSAA is to be performed. The AMF may add the default network slices to the list of pending network slices (e.g., Pending S-NSSAIs) even if none of the requested network slices was subject to NSSAA.

At time T3, the AMF provides the allowed network slice(s) to the UE in response to the registration request. The message transmitted at time T3 may also include the list of Pending S-NSSAIs. The list of Pending S-NSSAIs transmitted at time T3 includes the default network slices that are pending NSSAA.

At time T4, the AMF performs NSSAA, or attempts to perform, for each default network slice in case the network needs to use them later for a PDU session setup. At time T5, the AMF may store the NSSAA results for each default network slice for which it performed NSSAA in a UE context, even if the UE never provided the default network slice in the requested NSSAI in the registration request.

In one configuration, at time T6, the UE refrains from transmitting a PDU session request without a corresponding network slice until NSSAA of all the slices that are pending NSSAA is complete. That is, the UE shall not attempt to establish a PDU session without providing an S-NSSAI until the NSSAA procedure has been completed for all the S-NSSAIs in the Pending S-NSSAIs.

At time T7, the AMF may perform and complete the NSSAA procedure for all default slices corresponding to NSSAI(s) subject to NSSAA as indicated in the UE subscription profile. In some examples, if the default network slices are subject to NSSAA and the NSSAA failed for all default network slices, the network rejects any PDU session request from the UE that does not include a network slice. In some other examples, the AMF returns a new Allowed NSSAI containing the slices for which NSSAA succeeded, and this may include the default NSSAIs.

In other examples, when the AMF receives a PDU session request that does not contain an indication of a network slice, the AMF verifies the status of the NSSAA for the default network slices that are subject to NSSAA. As shown in FIG. 3B, at time T8, the UE transmits a PDU session request that does not contain an indication of a network slice. At time T9, the AMF verifies the status of the NSSAA for the default network slices that are subject to NSSAA. At time T10A, the AMF selects a default network slice that has satisfied one of the following conditions: succeeded NSSAA or is not subject to NSSAA. At time T10B, the AMF establishes the PDU with the UE via the selected default network slice. If none of the default network slices has satisfied either of the aforementioned conditions, the AMF rejects the establishment procedure with a cause indication, such as "no S-NSSAI allowed" (time T11).

That is, when the AMF completes the NSSAA procedure, if the AMF determines that no S-NSSAI can be provided in the allowed NSSAI for the UE, which is already authenticated and authorized successfully by a public land mobile network (PLMN), and if no default S-NSSAI(s) could be added (e.g., all default S-NSSAIs are subject to NSSAA and the result of the NSSAA on default S-NSSAIs are all marked as failure in the UE context in the AMF), the AMF shall execute a network-initiated deregistration procedure. The AMF includes in the explicit deregistration request message the list of rejected S-NSSAIs, each of them with the appropriate rejection cause value. The AMF refrains from including in the list of the rejected S-NSSAIs the S-NSSAIs corresponding to the default network slices.

As indicated above, FIGS. 3A-3B are provided as examples. Other examples may differ from what is described with respect to FIGS. 3A-3B.

Figure 4:
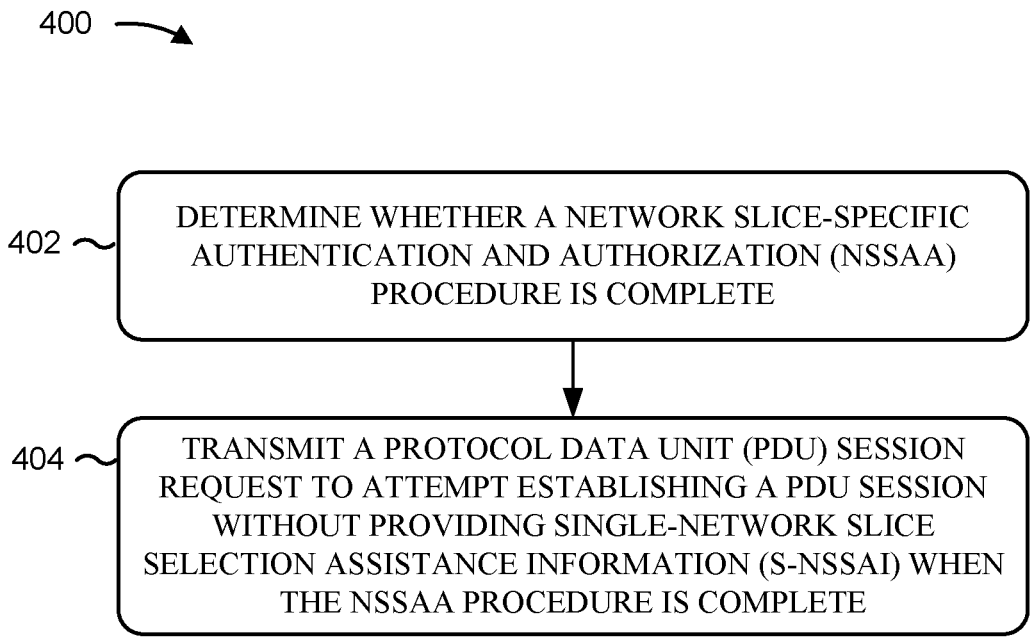
FIG. 4 is a flow diagram illustrating an example process performed, for example, by a UE, in accordance with various aspects of the present disclosure.

FIG. 4 is a flow diagram illustrating an example process 400 performed, for example, by a UE, in accordance with various aspects of the present disclosure. The example process 400 is an example of wireless communications, by a UE (user equipment), such as the UE 120d as described in FIGS. 1A-1B, or by a network slice module 140 as described in FIG. 1A. The process 400 may include determining whether an NSSAA procedure is complete (block 402). For example, the UE (e.g., using the antenna 252, DEMOD 254, MIMO detector 256, receive processor 258, controller/processor 280, memory 282, and or the like) can determine whether an NSSAA procedure is complete (block 402). The process 400 may also include transmitting a PDU session request to attempt establishing a PDU session without providing an S-NSSAI when the NSSAA procedure is complete (block 404). For example, the UE (e.g., using the antenna 252, MOD 254, TX MIMO processor 266, controller/processor 280, memory 282, and or the like) can transmit a PDU session request to attempt establishing a PDU session without providing an S-NSSAI when the NSSAA procedure is complete. For example, as seen at time T6 of FIG. 3B, the UE refrains from transmitting a PDU session request without a corresponding network slice until NSSAA of all the slices that are pending NSSAA is complete. That is, the UE shall not attempt to establish a PDU session without providing an S-NSSAI until the NSSAA procedure has been completed for all the S-NSSAIs in the Pending S-NSSAIs.

Figure 5:
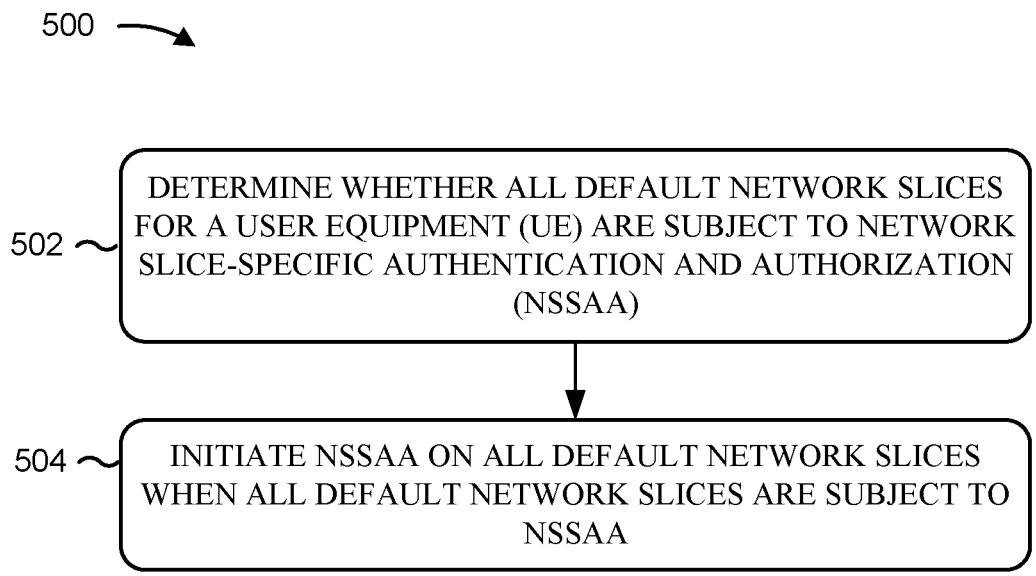
FIG. 5 is a flow diagram illustrating an example process performed, for example, by an access and mobility management function (AMF), in accordance with various aspects of the present disclosure.

FIG. 5 is a flow diagram illustrating an example process 500 performed, for example, by an AMF, in accordance with various aspects of the present disclosure. The example process 500 is an example of wireless communications, by an AMF, such as the AMF 152 as described in FIG. 1B, or by a default network slice module 138 as described in FIG. 1A. The process 500 includes determining whether all default network slices for a UE are subject to NSSAA (block 502). Each default network slice may correspond to an S-NSSAI. For example, one or more components of the AMF 152, such as a controller/processor, memory, and or the like, may determine whether all default network slices are subject to NSSAA. As seen at time T2 of FIG. 3B, the AMF may verify one or more of the requested network slices. Additionally, in response to the registration request, the AMF determines to authenticate and authorize (e.g., perform NSSAA) on one or more of the default network slices indicated in the UE subscription profile, if all default network slices are subject to NSSAA as indicated in the UE subscription profile. That is, the AMF determines that the NSSAA procedure should be initiated on the default S-NSSAIs if all default S-NSSAIs are subject to NSSAA. In some configurations, the AMF updates a list of network slices that are pending NSSAA to include the default network slices that are pending NSSAA. That is, the list of Pending S-NSSAIs includes S-NSSAIs for which NSSAA is to be performed, and the list of Pending S-NSSAIs includes the default NSSAI(s) for which NSSAA is to be performed. The AMF may add the default network slices to the list of pending network slices (e.g., Pending S-NSSAIs) even if none of the requested network slices was subject to NSSAA.

The process 500 may also include initiating the NSSAA on all default network slices when all default network slices are subject to NSSAA (block 504). For example, one or more components of the AMF 152, such as a controller/processor, memory, antenna, transceiver, TX processor, RX processor, and/or the like may initiate the NSSAA on all default S-NSSAIs when all default S-NSSAIs are subject to NSSAA. As seen at time T5 of FIG. 3B, the AMF may store the NSSAA results for each default network slice for which it performed NSSAA in a UE context, even if the UE never provided the default network slice in the requested NSSAI in the registration request.

Implementation examples are described in the following numbered clauses.

1. A method for wireless communications, by a user equipment (UE), comprising:
   determining whether a network slice-specific authentication and authorization (NSSAA) procedure is complete; and
   transmitting a protocol data unit (PDU) session request to attempt establishing a PDU session without providing single-network slice selection assistance information (S-NSSAI) when the NSSAA procedure is complete.

2. The method of clause 1, further comprising preventing transmitting of the PDU session request until the NSSAA procedure is complete.

3. A method for wireless communications, by an access and mobility management function (AMF), comprising:

determining whether all default network slices for a user equipment (UE) are subject to network slice-specific authentication and authorization (NSSAA); and initiating NSSAA on the default network slices when all default network slices are subject to NSSAA.

4. The method of clause 3, further comprising adding default network slices for which the NSSAA is to be performed to a list of Pending single-network slice selection assistance information (S-NSSAIs).

5. The method of clause 3 or 4, in which the default network slices are added to the list regardless of whether a requested NSSAI was subject to NSSAA.

6. The method of any of the clauses 3-5, further comprising verifying a status of the NSSAA for each default network slice, the status indicating whether the NSSAA succeeded or failed.

7. The method of any of the clauses 3-6, further comprising storing the status of the NSSAA for each default network slice.

8. The method of any of the clauses 3-7, further comprising receiving, from the UE, a protocol data unit (PDU) session request without single-network slice selection assistance information (S-NSSAI).

9. The method of any of the clauses 3-8, further comprising rejecting, in response to the PDU session request, an establishment procedure when all default network slices are subject to NSSAA and all default network slices failed the NSSAA.

10. The method of any of the clauses 3-9, further comprising rejecting the establishment procedure with a no S-NSSAI allowed cause indication.

11. The method of any of the clauses 3-10, further comprising selecting a default network slice that succeeded NSSAA in response to the PDU session request.

12. An apparatus for wireless communications at a user equipment (UE), comprising:
at least one processor;
a memory coupled with the at least one processor; and
instructions stored in the memory and operable, when executed by the at least one processor, to cause the apparatus:
to determine whether a network slice-specific authentication and authorization (NSSAA) procedure is complete; and
to transmit a protocol data unit (PDU) session request to attempt establishing a PDU session without providing a single-network slice selection assistance information (S-NSSAI) when the NSSAA procedure is complete.

13. The apparatus of clause 12, in which the instructions, when executed by the at least one processor, are further operable to cause the apparatus to prevent transmitting of the PDU session request until the NSSAA procedure is complete.

14. An apparatus for wireless communications at an access and mobility management function (AMF), comprising:
at least one processor;
a memory coupled with the at least one processor; and
instructions stored in the memory and operable, when executed by the at least one processor, to cause the apparatus:
to determine whether all default network slices for a user equipment (UE) are subject to network slice-specific authentication and authorization (NSSAA); and to initiate NSSAA on all default network slice when all default network slices are subject to NSSAA.

15. The apparatus of clause 14, in which the instructions, when executed by the at least one processor, are further operable to add default network slices for which the NSSAA is to be performed to a list of pending network slices.

16. The apparatus of clause 14 or 15, in which the default network slices are added to the list regardless of whether a requested single-network slice selection assistance information (S-NSSAI) was subject to NSSAA.

17. The apparatus of any of the Clauses 14-16, in which the instructions, when executed by the at least one processor, are further operable to verify a status of the NSSAA for each default network slice, the status indicating whether the NSSAA succeeded or failed.

18. The apparatus of any of the clauses 14-17, in which the instructions, when executed by the at least one processor, are further operable to store the status of the NSSAA for each default network slice.

19. The apparatus of any of the clauses 14-18, in which the instructions, when executed by the at least one processor, are further operable to receive, from the UE, a protocol data unit (PDU) session request without single-network slice selection assistance information (S-NSSAI).

20. The apparatus of any of the clauses 14-19, in which the instructions, when executed by the at least one processor, are further operable to reject, in response to the PDU session request, an establishment procedure when all default network slices are subject to NSSAA and all default network slices failed the NSSAA.

21. The apparatus of any of the clauses 14-20, in which the instructions, when executed by the at least one processor, are further operable to reject the establishment procedure with a no S-NSSAI allowed cause indication.

22. The apparatus of any of the clauses 14-21, in which the instructions, when executed by the at least one processor, are further operable to select a default network slice that succeeded NSSAA in response to the PDU session request.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communications, by an access and mobility management function (AMF), comprising:
   determining whether all default network slices for a user equipment (UE) are subject to network slice-specific authentication and authorization (NSSAA), each default network slice selected based on UE subscription information, local policies, and a UE subscription profile, the determining occurring in response to a registration request from the UE;
   initiating NSSAA on the default network slices when all default network slices are determined to be subject to NSSAA;
   verifying a status of the NSSAA for each default network slice, the status indicating whether the NSSAA succeeded or failed;
   storing the status of the NSSAA for each default network slice; and
   receiving, from the UE, a protocol data unit (PDU) session request without single-network slice selection assistance information (S-NSSAI).

2. The method of claim 1, further comprising adding default network slices for which the NSSAA is to be performed to a list of Pending single-network slice selection assistance information (S-NSSAIs).

3. The method of claim 2, in which the default network slices are added to the list regardless of whether a requested NSSAI was subject to NSSAA.

4. The method of claim 1, further comprising rejecting, in response to the PDU session request, an establishment procedure when all default network slices are subject to NSSAA and all default network slices failed the NSSAA.

5. The method of claim 4, further comprising rejecting the establishment procedure with a no S-NSSAI allowed cause indication.

6. The method of claim 1, further comprising selecting a default network slice that succeeded NSSAA in response to the PDU session request.

7. An apparatus for wireless communications at an access and mobility management function (AMF), comprising:
   at least one processor;
   a memory coupled with the at least one processor; and
   instructions stored in the memory and operable, when executed by the at least one processor, to cause the apparatus:
      to determine whether all default network slices for a user equipment (UE) are subject to network slice-specific authentication and authorization (NSSAA), each default network slice selected based on UE subscription information, local policies, and a UE subscription profile, the determining occurring in response to a registration request from the UE;
      to initiate NSSAA on all default network slice when all default network slices are determined to be subject to NSSAA;
      to verify a status of the NSSAA for each default network slice, the status indicating whether the NSSAA succeeded or failed;
      to store the status of the NSSAA for each default network slice; and
      to receive, from the UE, a protocol data unit (PDU) session request without single-network slice selection assistance information (S-NSSAI).

8. The apparatus of claim 7, in which the instructions, when executed by the at least one processor, are further operable to add default network slices for which the NSSAA is to be performed to a list of pending network slices.

9. The apparatus of claim 8, in which the default network slices are added to the list regardless of whether a requested single-network slice selection assistance information (S-NSSAI) was subject to NSSAA.

10. The apparatus of claim 7, in which the instructions, when executed by the at least one processor, are further operable to reject, in response to the PDU session request, an establishment procedure when all default network slices are subject to NSSAA and all default network slices failed the NSSAA.

11. The apparatus of claim 10, in which the instructions, when executed by the at least one processor, are further operable to reject the establishment procedure with a no S-NSSAI allowed cause indication.

12. The apparatus of claim 7, in which the instructions, when executed by the at least one processor, are further operable to select a default network slice that succeeded NSSAA in response to the PDU session request.

13. An apparatus for wireless communications, by an access and mobility management function (AMF), comprising:
   means for determining whether all default network slices for a user equipment (UE) are subject to network slice-specific authentication and authorization (NSSAA), each default network slice selected based on UE subscription information, local policies, and a UE subscription profile, the determining occurring in response to a registration request from the UE;
   means for initiating NSSAA on the default network slices when all default network slices are determined to be subject to NSSAA;
   means for verifying a status of the NSSAA for each default network slice, the status indicating whether the NSSAA succeeded or failed;

means for storing the status of the NSSAA for each default network slice; and means for receiving, from the UE, a protocol data unit (PDU) session request without single-network slice selection assistance information (S-NSSAI).

14. The apparatus of claim 13, further comprising means for adding default network slices for which the NSSAA is to be performed to a list of Pending single-network slice selection assistance information (S-NSSAIs).

15. The apparatus of claim 14, in which the means for adding default network slices adds to the list regardless of whether a requested NSSAI was subject to NSSAA.

16. A non-transitory computer readable medium storing program code for wireless communications at an access and mobility management function (AMF), the program code executed by a processor and comprising:

program code to determine whether all default network slices for a user equipment (UE) are subject to network slice-specific authentication and authorization (NS-SAA), each default network slice selected based on UE subscription information, local policies, and a UE subscription profile, the determining occurring in response to a registration request from the UE;

program code to initiate NSSAA on all default network slice when all default network slices are determined to be subject to NSSAA;

program code to verify a status of the NSSAA for each default network slice, the status indicating whether the NSSAA succeeded or failed;

program code to store the status of the NSSAA for each default network slice; and program code to receive, from the UE, a protocol data unit (PDU) session request without single-network slice selection assistance information (S-NSSAI).

17. The computer readable medium of claim 16, further comprising program code to add default network slices for which the NSSAA is to be performed to a list of pending network slices.

18. The computer readable medium of claim 17, in which the default network slices are added to the list regardless of whether a requested single-network slice selection assistance information (S-NSSAI) was subject to NSSAA.

* * * * *